United States Patent
Jeong et al.

(10) Patent No.: US 11,130,486 B2
(45) Date of Patent: Sep. 28, 2021

(54) LIMP-HOME CONTROL METHOD FOR HYBRID VEHICLE

(71) Applicants: HYUNDAI MOTOR COMPANY, Seoul (KR); KIA MOTORS CORPORATION, Seoul (KR)

(72) Inventors: Sang Hyun Jeong, Hwaseong-si (KR); Hak Sung Lee, Hwaseong-si (KR); Seong Hwan Kim, Hwaseong-si (KR); Dae Won Yang, Seongnam-si (KR); Gyeong Cheol Kim, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 336 days.

(21) Appl. No.: 16/390,653

(22) Filed: Apr. 22, 2019

(65) Prior Publication Data

US 2020/0156622 A1    May 21, 2020

(30) Foreign Application Priority Data

Nov. 19, 2018  (KR) .................. 10-2018-0142795

(51) Int. Cl.
*B60W 20/50* (2016.01)
*B60W 20/15* (2016.01)
*B60W 10/26* (2006.01)
*B60K 6/365* (2007.10)

(52) U.S. Cl.
CPC ............ *B60W 20/50* (2013.01); *B60K 6/365* (2013.01); *B60W 10/26* (2013.01); *B60W 20/15* (2016.01); *B60Y 2200/92* (2013.01)

(58) Field of Classification Search
None
See application file for complete search history.

(56) References Cited

U.S. PATENT DOCUMENTS

| | | | |
|---|---|---|---|
| 8,403,787 B2* | 3/2013 | Kim ..................... | B60K 6/445 475/5 |
| 9,127,667 B2* | 9/2015 | Lee ..................... | F04B 17/03 |
| 9,718,464 B2* | 8/2017 | Inoue ................. | B60W 10/023 |
| 10,359,110 B2* | 7/2019 | Kobayashi ........... | B60K 6/445 |

FOREIGN PATENT DOCUMENTS

KR    10-2018-0117744 A    10/2018

* cited by examiner

*Primary Examiner* — Dirk Wright
(74) *Attorney, Agent, or Firm* — Morgan, Lewis & Bockius LLP

(57) ABSTRACT

A limp-home control method for a hybrid vehicle may include: a fault determination step for determining, by a controller, whether a solenoid valve battery short circuit fault occurs in a transmission; a first limp-home step for controlling, by the controller, solenoid valves to implement a limp-home gear stage while maintaining a state where power is suppliable to the solenoid valves involved in shifting gears when it is determined that the solenoid valve battery short circuit fault exists; an engine necessity verification step for verifying, by the controller, whether engagement of an engine clutch is needed; and a second limp-home step for driving, by the controller, a solenoid valve controlling the engine clutch to engage the engine clutch, implementing limp-home driving by engine power when the engagement of the engine clutch is needed.

10 Claims, 3 Drawing Sheets

LIMP-HOME CONTROL METHOD FOR HYBRID VEHICLE

CROSS REFERENCE TO RELATED APPLICATION

The present application claims priority to Korean Patent Application No. 10-2018-0142795, filed Nov. 19, 2018, the entire contents of which is incorporated herein for all purposes by this reference.

BACKGROUND OF THE INVENTION

Field of the Invention

The present invention relates to a limp-home control method for a hybrid vehicle in which an engine and a motor are connected by an engine clutch.

Description of Related Art

A vehicle has a limp-home function for facilitating the vehicle to move to a nearby repair shop or the like in the case of an unexpected failure situation.

It is further preferable that in terms of vehicle safety, a maximal travel distance of the vehicle in the limp-home mode is ensured.

In a transmission mounted electric device (TMED) hybrid vehicle in which an engine and a motor are connected through an engine clutch, even if a solenoid valve that controls a transmission has a battery short circuit fault, a maximal travel distance of the vehicle in the limp-home mode is ensured.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a limp-home control method for a hybrid vehicle, in which when a solenoid valve that controls a transmission has a battery short circuit fault in a TMED hybrid vehicle where an engine and a motor are connected through an engine clutch, a maximal travel distance of the vehicle in the limp-home mode is ensured, to improve the running stability of the vehicle.

In various aspects of the present invention, there is provided a limp-home control method for a hybrid vehicle, the method including: fault determination for determining, by a controller, whether a solenoid valve battery short circuit fault occurs in a transmission; first limp-home implementation for controlling, by the controller, solenoid valves to implement a limp-home gear stage while maintaining a state where power is suppliable to the solenoid valves involved in shifting gears when it is determined that the solenoid valve battery short circuit fault exists; engine necessity verification for verifying, by the controller, whether engagement of an engine clutch is needed; and second limp-home implementation for driving, by the controller, a solenoid valve controlling the engine clutch to engage the engine clutch, implementing limp-home driving by engine power when the engagement of the engine clutch is needed.

The method may further include power checking for determining, by the controller, before the first limp-home implementation, whether there is neither power failure nor ground fault of the solenoid valves, and allowing the first limp-home implementation to be performed only when there is neither the power failure nor the ground fault of the solenoid valves.

The controller may release the state where power is suppliable to the solenoid valves when a power failure or a ground fault of the solenoid valves is identified.

In the first limp-home implementation, drive current of the solenoid valves involved in shifting gears may be cut off or may be formed at a level of 0 to 50 mA at which no hydraulic pressure is generated.

In the engine necessity verification, when it is determined that battery SOC for the limp-home driving is below a predetermined value, it may be determined that the engagement of the engine clutch is needed.

In the engine necessity verification, when it is determined that required power of the vehicle increases and smooth running is difficult in electric vehicle (EV) driving, it may be determined that the engagement of the engine clutch is needed.

The solenoid valves involved in shifting gears may be configured to form the limp-home gear stage when all drive current is cut off.

The solenoid valve controlling the engine clutch may be configured to be supplied with power through a common power line with the solenoid valves involved in shifting gears.

According to an exemplary embodiment of the present invention, it is advantageous in that when a solenoid valve that controls a transmission has a battery short circuit fault in a TMED hybrid vehicle where an engine and a motor are connected through an engine clutch, a maximal travel distance of the vehicle in the limp-home mode is ensured as long as possible, whereby it is possible to improve the running stability of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
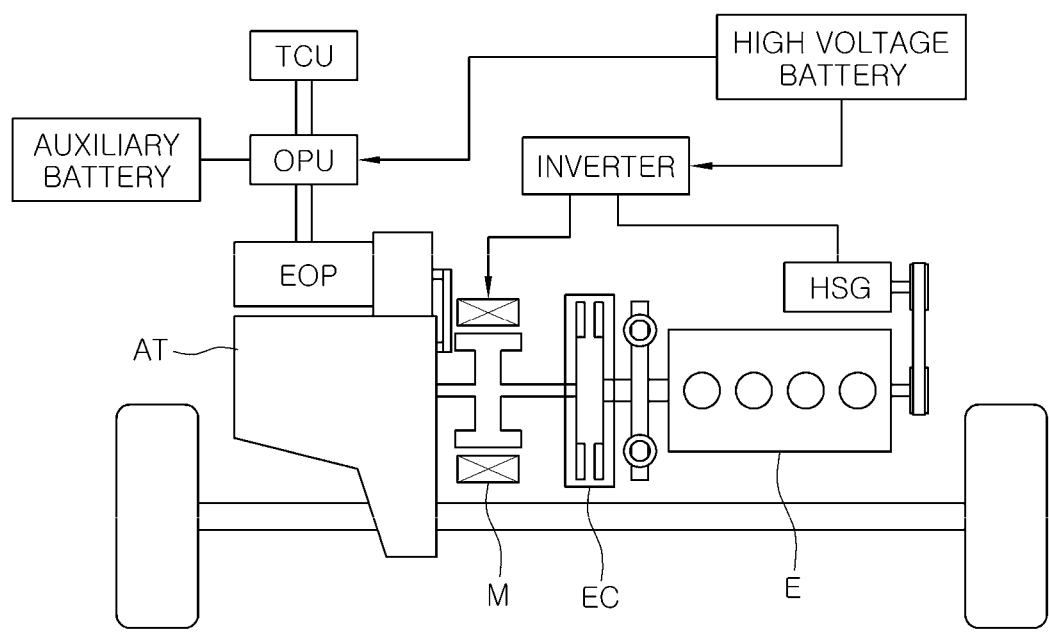
FIG. 1 is a view showing a configuration of a hybrid vehicle to which the present invention is applicable.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, an automatic transmission for a vehicle according to an exemplary embodiment of the present invention will be described in detail with reference to the accompanying drawings.

Referring to FIG. 1, a hybrid vehicle to which the present invention is applicable is configured to transmit the power of an engine E to a transmission AT via an engine clutch EC, wherein an input shaft of the transmission is provided with a motor M to form a hybrid powertrain.

The motor M is controlled by an inverter using electricity from a high-voltage battery, and a hybrid starter generator (HSG) on the engine side connected to the inverter is configured for starting the engine E and generating power.

The transmission AT has a configuration of an automatic transmission including a conventional torque converter, planetary gear devices, a valve body, and the like, wherein the oil pressure for driving of the valve body and lubrication and cooling of the transmission is generated by an electric oil pump controlled by an oil pump control unit (OPU), and a transmission control unit (TCU) is configured to control the transmission.

The TCU controls a plurality of solenoid valves provided in the valve body to achieve the shift of the transmission, and may be configured to implement Electric Vehicle (EV) driving and hybrid driving by controlling the engine clutch EC by receiving commands from a separate host controller such as a hybrid control unit (HCU).

Figure 2:
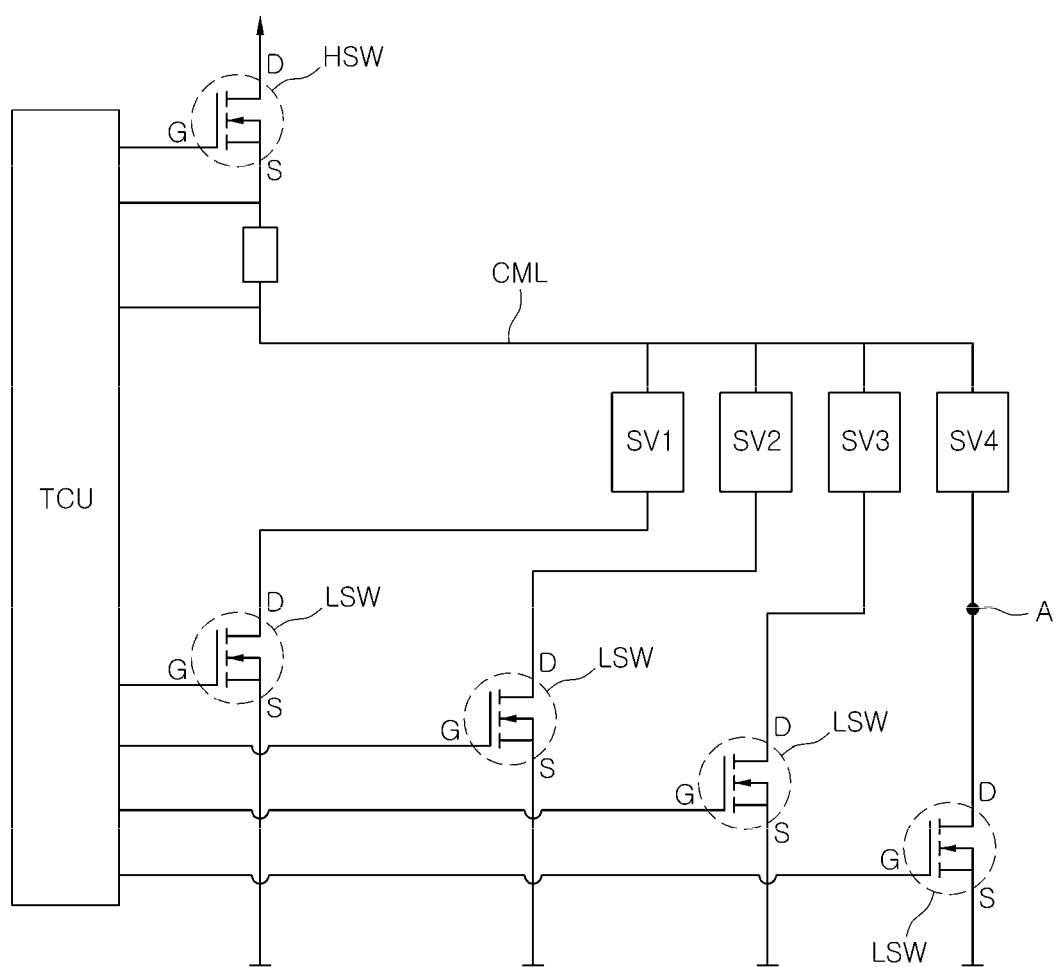
FIG. 2 is a drive circuit diagram of transmission solenoid valves to which the present invention is applicable.

FIG. 2 is an example of a circuit where the TCU drives solenoid valves involved in shifting gears, wherein a first solenoid valve SV1 on the left is configured for controlling the engine clutch EC, and a second solenoid valve SV2, a third solenoid valve SV3, and a fourth solenoid valve SV4 on the right are provided to form the gear stages of the transmission in accordance with the respective operating combinations.

For reference, the larger the number of gear stages to be implemented is, the more the solenoid valves used in implementing gear stages of the transmission are required, so a larger number of solenoid valves may be provided depending on the transmission configuration.

The solenoid valves are configured such that upper sides thereof are connected to a common power line (CML) so that whether or not the current is supplied may be switched by a high side drive switch (hereinafter, referred to as HSW), and lower sides thereof are provided with separate low side drive switches (hereinafter, referred to as LSW), respectively, so that current supply may be switched.

The HSW and LSW include switching elements such as metal oxide semiconductor field effect transistor (MOSFET) or insulated gate bipolar transistor (IGBT) driven by TCU, and the HSW is configured to connect the solenoid valves to a relatively high potential, such as the anode of the battery, and the LSW is configured to connect the same to a relatively low potential, such as ground.

Thus, the TCU performs the desired shift operation by individually manipulating the LSWs with the HSW turned on by default.

Figure 3:
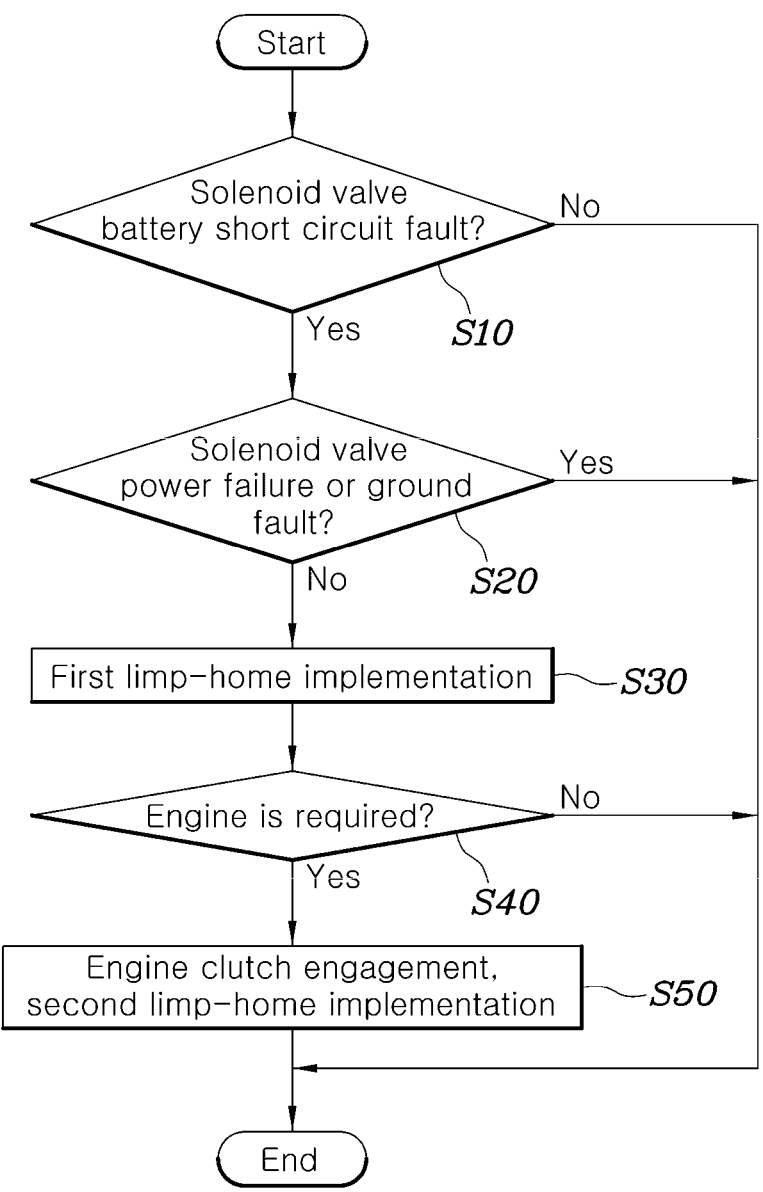
FIG. 3 is a flowchart showing an exemplary embodiment of a limp-home control method for a hybrid vehicle according to an exemplary embodiment of the present invention.

Referring to FIG. 3, an exemplary embodiment of a limp-home control method for a hybrid vehicle according to an exemplary embodiment of the present invention includes: a fault determination step for determining, by a controller, whether a solenoid valve battery short circuit fault occurs in a transmission (S10); a first limp-home step for controlling, by the controller, solenoid valves to implement a limp-home gear stage while maintaining a state where power is suppliable to the solenoid valves involved in shifting gears when it is determined that the solenoid valve battery short circuit fault occurs (S30); an engine necessity verification step for verifying, by the controller, whether engagement of an engine clutch is needed (S40); and a second limp-home step for driving, by the controller, a solenoid valve controlling the engine clutch to engage the engine clutch, implementing limp-home driving by engine power when the engagement of the engine clutch is needed (S50).

For reference, the controller may have the TCU of FIG. 1 and FIG. 2.

Herein, the solenoid valve battery short circuit fault means that the anode of the battery is short-circuited to the line between the solenoid valve and the LSW as in point an in FIG. 2.

Furthermore, the state in which power is suppliable to the solenoid valves is a state in which the HSW is turned on in FIG. 2, and in the instant state, the drive current is applied to the corresponding solenoid valve when only the LSW is additionally turned on.

The limp-home gear stage is a pre-engineered gear stage for a limp-home driving that allows the vehicle to move to a nearby repair shop with a fixed gear stage state in the event of a failure, and normally, when power is not supplied to all the solenoid valves involved in shifting gears, the mechanically automatic gear stage is designed as a limp-home gear stage to prepare for electrical failures.

Furthermore, the present invention further includes a power checking step (S20) before implementing the first limp-home step (S30), for determining, by the controller, whether there is neither power failure nor ground fault of the solenoid valves, and allowing the first limp-home implementation to be performed only when there is neither the power failure nor the ground fault of the solenoid valves.

Herein, the power failure refers to a case where an abnormality occurs in the HSW or the common power line in the example of FIG. 2 and the power cannot be supplied to the solenoid valves.

Furthermore, the ground fault means that the line between the solenoid valve and the LSW is short-circuited to ground as in point A in FIG. 2.

In other words, the present invention is configured, as described above, such that when a solenoid valve battery short circuit fault occurs, in the case where it is not power failure so that the power may be supplied to the solenoid valves and it is not a ground fault, the state where power is suppliable to the solenoid valves remains, based on which the solenoid valves involved in shifting gears are controlled to form the limp-home gear stage. Later, when it is determined that the engagement of the engine clutch is needed by the engine necessity verification step S40, the solenoid valve controlling the engine clutch is controlled to engage the engine clutch, facilitating limp-home driving using engine power alone or along with the power of a motor.

In the case where the solenoid valve battery short circuit fault occurs, when the drive current unconditionally supplied to the solenoid valves regardless of the operation of the LSW is cut off by turning off the HSW, the solenoid valve for controlling the engine clutch cannot be driven and only the limp-home driving is possible only in EV mode. However, as in an exemplary embodiment of the present invention, while maintaining the limp-home driving in EV mode, the HSW remains on such that the state in which power is suppliable to the solenoid valves is maintained, and as such, in the case where the SOC value of the high-voltage battery is below a predetermined value or the additional required power is required, when the limp-home driving is continued with the driving force from the engine by connecting the engine clutch, the travelable distance in the limp-home driving may be greatly increased, further improving the driving safety of the vehicle.

Of course, as described above, the present invention is beneficial when a solenoid valve that controls the engine clutch is configured to be supplied with power by the common power line with the solenoid valves involved in shifting gears.

The controller releases the state where power is suppliable to the solenoid valves when a power failure or a ground fault of the solenoid valves is identified.

In other words, in the event of the power failure or ground fault, the HSW is shut off to prevent the solenoid valves from being supplied with power in common, preventing additional failures.

Of course, since the solenoid valves involved in shifting gears are configured to form the limp-home gear stage by itself when all drive current is cut off, in the situation where the HSW is shut off as described above, the limp-home gear stage is formed by itself, and the vehicle is allowed to limp-home driving only in EV mode.

In the first limp-home step (S30), drive current of the solenoid valves involved in shifting gears is cut off or is formed at a level of 0 to 50 mA at which no hydraulic pressure is generated.

In other words, while maintaining the HSW on, the controller shuts off the LSWs connected to the solenoid valves involved in shifting gears to cut off the drive current, forming the limp-home gear stage.

The current of 0 to 50 mA, as a level at which the solenoid valve cannot be actually driven to regulate the hydraulic pressure, means the level of current that can flow even when the LSW is off.

Meanwhile, in the engine necessity verification step (S40), when it is determined that battery SOC for the limp-home driving is below a predetermined value, it is determined that the engagement of the engine clutch is needed; and when it is determined that required power of the vehicle increases and smooth running of the vehicle is difficult in EV driving, it is also determined that the engagement of the engine clutch is needed.

In an exemplary embodiment of the present invention, the smooth running of the vehicle is determined to be difficult in EV driving when it is determined by the controller that the required power is more than a predetermined value.

Accordingly, when it is determined that the power of the engine is required to continue the limp-home driving, the controller drives the solenoid valve controlling the engine clutch as described above to engage the engine clutch, such that the limp-home driving is continued using the power of the engine along with the power of the motor or using the power of the engine alone.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A limp-home control method for a vehicle, the method comprising:
   fault determination of determining, by a controller, when a solenoid valve battery short circuit fault occurs in a transmission of the vehicle;
   first limp-home implementation of controlling, by the controller, solenoid valves to implement a limp-home gear stage while maintaining a state where power is suppliable to the solenoid valves involved in shifting gears when it is determined by the controller that the solenoid valve battery short circuit fault occurs;
   engine necessity verification of verifying, by the controller, when engagement of an engine clutch is needed after it is determined by the controller that the solenoid valve battery short circuit fault occurs; and
   second limp-home implementation of driving, by the controller, a solenoid valve controlling the engine clutch, to engage the engine clutch, implementing limp-home driving by engine power when it is determined by the controller that the engagement of the engine clutch is needed.

2. The method of claim 1, further including:
   determining, by the controller, before the first limp-home implementation, when there is neither power failure nor ground fault of the solenoid valves, and allowing the first limp-home implementation to be performed when there is neither the power failure nor the ground fault of the solenoid valves.

3. The method of claim 2, wherein the controller is configured to release the state where the power is suppliable to the solenoid valves when the power failure or the ground fault of the solenoid valves is identified.

4. The method of claim 1, wherein, in the first limp-home implementation, drive current of the solenoid valves involved in shifting the gears is cut off or is formed at a level of 0 to 50 mA at which no hydraulic pressure is generated.

5. The method of claim 1, wherein, in the engine necessity verification, when it is determined by the controller that battery state of charge (SOC) for the limp-home driving is below a predetermined value, it is determined by the controller that the engagement of the engine clutch is needed.

6. The method of claim 1, wherein, in the engine necessity verification, when it is determined by the controller that required power of the vehicle increases and running of the vehicle is difficult in electric vehicle (EV) driving, it is determined by the controller that the engagement of the engine clutch is needed.

7. The method of claim 1, wherein the running of the vehicle is determined to be difficult in EV driving when the controller determines that the required power is more than a predetermined value.

8. The method of claim 1, wherein the solenoid valves involved in shifting the gears are configured to form a limp-home gear stage when all drive current is cut off.

9. The method of claim 1, wherein the solenoid valve controlling the engine clutch is supplied with power through a common power line with the solenoid valves involved in shifting the gears.

10. The method of claim 9, wherein upper sides of the solenoid valve controlling the engine clutch and the solenoid valves involved in shifting the gears are connected to the common power line coupled to a first drive switch and lower sides of the solenoid valve controlling the engine clutch and the solenoid valves involved in shifting the gears are connected to second drive switches, respectively.

\* \* \* \* \*